US006999180B1

(12) United States Patent
Janik et al.

(10) Patent No.: US 6,999,180 B1
(45) Date of Patent: Feb. 14, 2006

(54) OPTICAL FILM TOPOGRAPHY AND THICKNESS MEASUREMENT

(75) Inventors: Gary R. Janik, Palo Alto, CA (US); Hidong Kwak, San Jose, CA (US); Ying Gao, San Jose, CA (US); Johannes D. De Veer, Menlo Park, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 323 days.

(21) Appl. No.: 10/405,528

(22) Filed: Apr. 2, 2003

(51) Int. Cl.
*G01B 9/02* (2006.01)
*G01B 11/28* (2006.01)

(52) U.S. Cl. ................... 356/503; 356/497; 356/630; 356/514

(58) Field of Classification Search ............ 356/451, 356/479, 489, 497, 503, 504, 512, 514, 630
See application file for complete search history.

(56) References Cited

U.S. PATENT DOCUMENTS

| | | | |
|---|---|---|---|
| 4,818,110 A | 4/1989 | Davidson ................ | 356/358 |
| 5,042,949 A | 8/1991 | Greenberg et al. ....... | 356/345 |
| 5,133,601 A | 7/1992 | Cohen et al. ............ | 356/359 |
| 6,545,763 B1 | 4/2003 | Kim et al. .............. | 356/503 |
| 2004/0185582 A1 * | 9/2004 | Kueny .................. | 438/16 |
| 2004/0189999 A1 | 9/2004 | De Groot et al. ........ | 356/497 |

OTHER PUBLICATIONS

Schwider et al., *Dispersive Interferometric Profilometer*, Optics Letters, vol. 19, No. 13, Jul. 1, 1994, Optical Society of America.

* cited by examiner

*Primary Examiner*—Hwa (Andrew) Lee
*Assistant Examiner*—Patrick Connolly
(74) *Attorney, Agent, or Firm*—Luedeka, Neely & Graham, P.C.

(57) ABSTRACT

An apparatus capable of measuring topography and transparent film thickness of a patterned metal-dielectric layer on a substrate without contact with the layer. A broadband interferometer measures an absolute phase of reflection at a plurality of wavelengths from a plurality of locations within a field of view on the metal-dielectric patterned layer on the substrate, and produces reflection phase data. An analyzer receives the reflection phase data and regresses the transparent film thickness and the topography at each of the plurality of locations from the reflection phase data. In this manner, the apparatus is not confused by the phase changes produced in the reflected light by the transparent layers, because the thickness of the transparent layers are determined by using the reflection phase data from multiple wavelengths. Further, the surface topography of the layer, whether it be opaque or transparent is also determinable. Thus, the present invention provides a means by which both transparent layer thickness and topography can be determined on an array surface of transparent and opaque layers, without contacting the surface of the layers.

22 Claims, 6 Drawing Sheets

Fig. 4
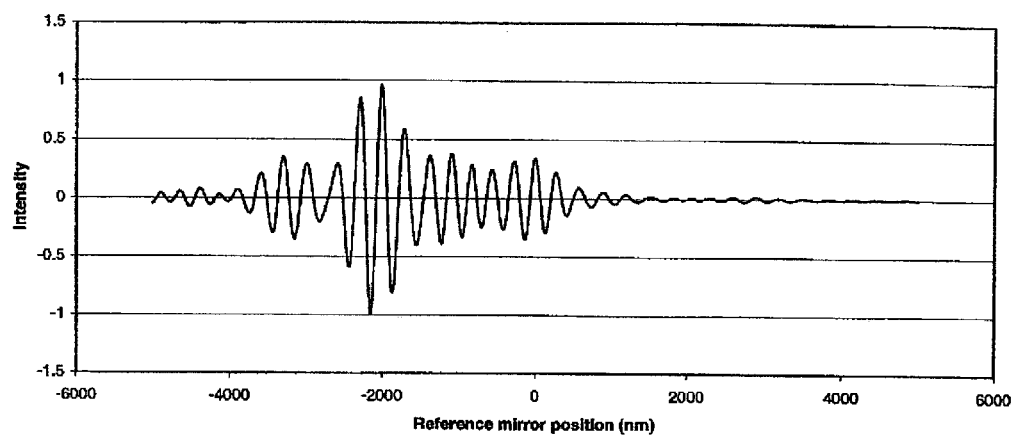
Transparent Film Interferogram
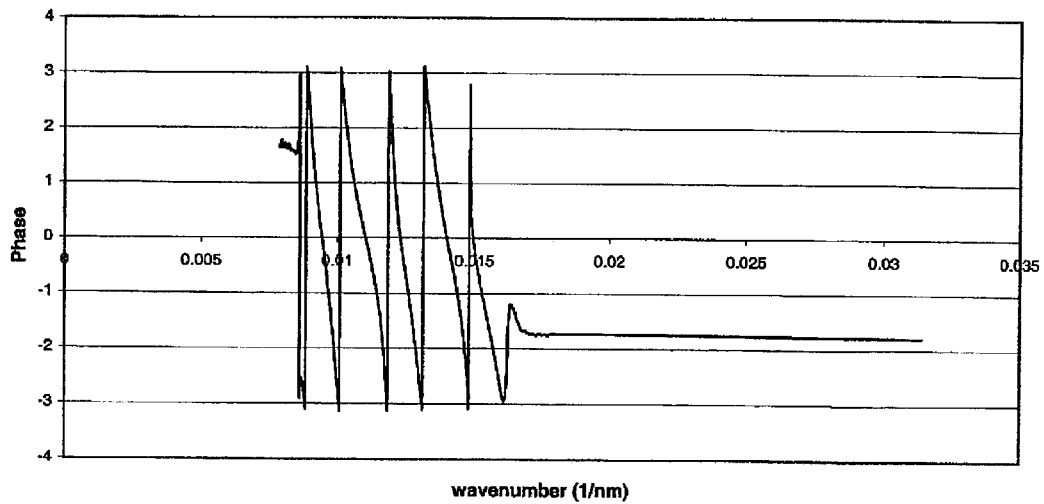
Transparent Film Phase Spectrum
Fig. 5

Fig. 6
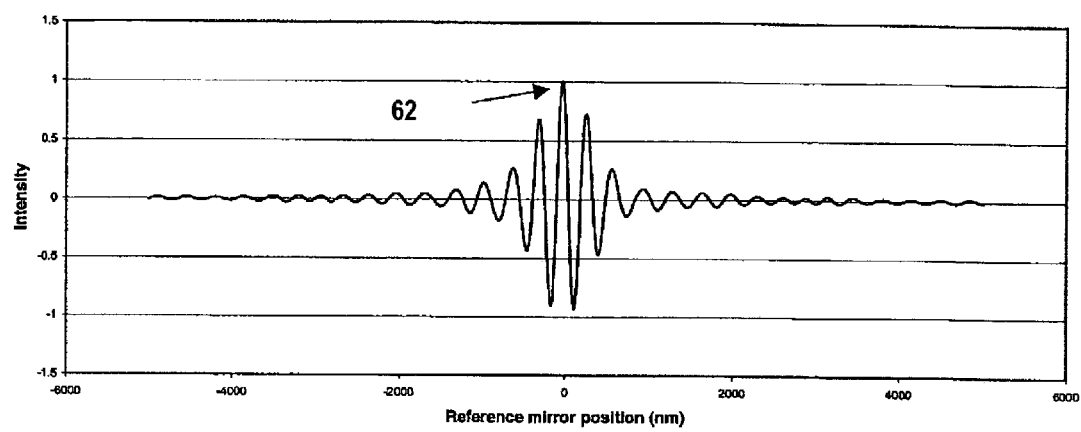
Copper Pad Interferogram
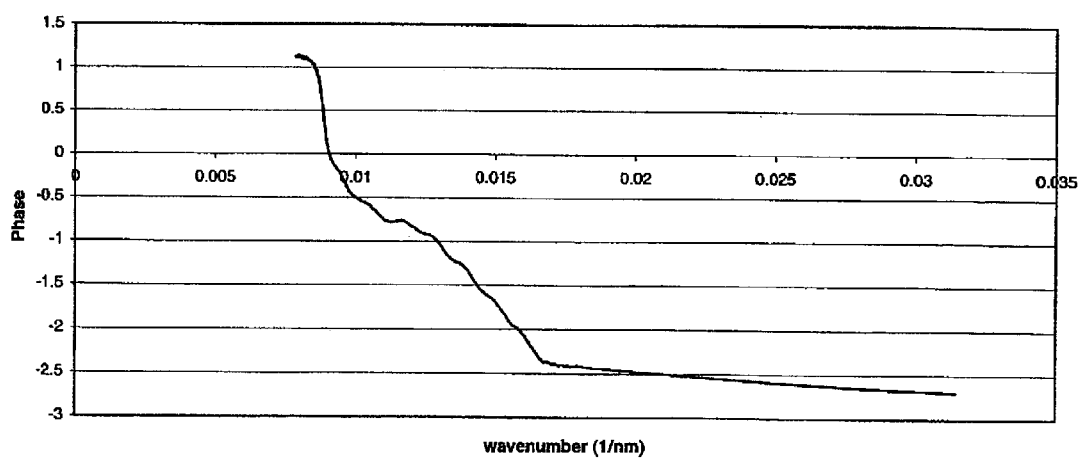
Copper Phase Spectrum
Fig. 7

Fig. 8
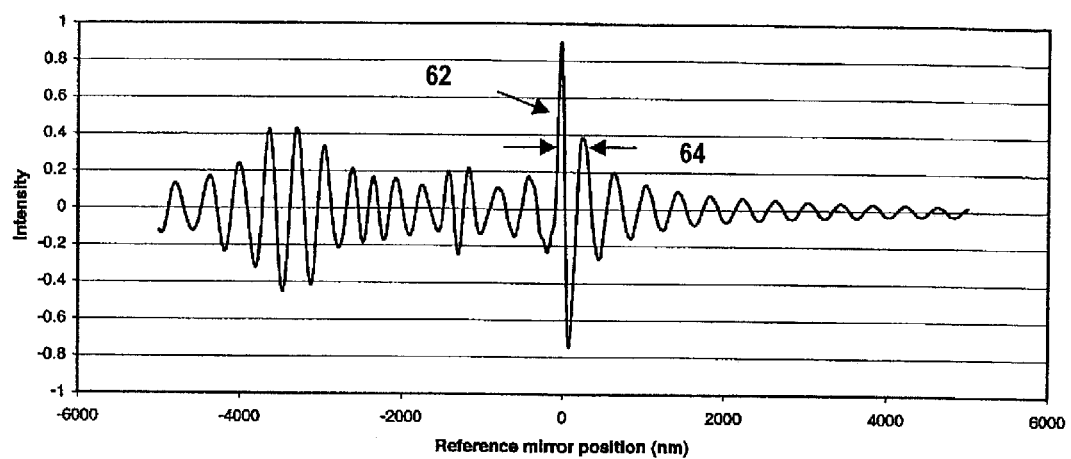
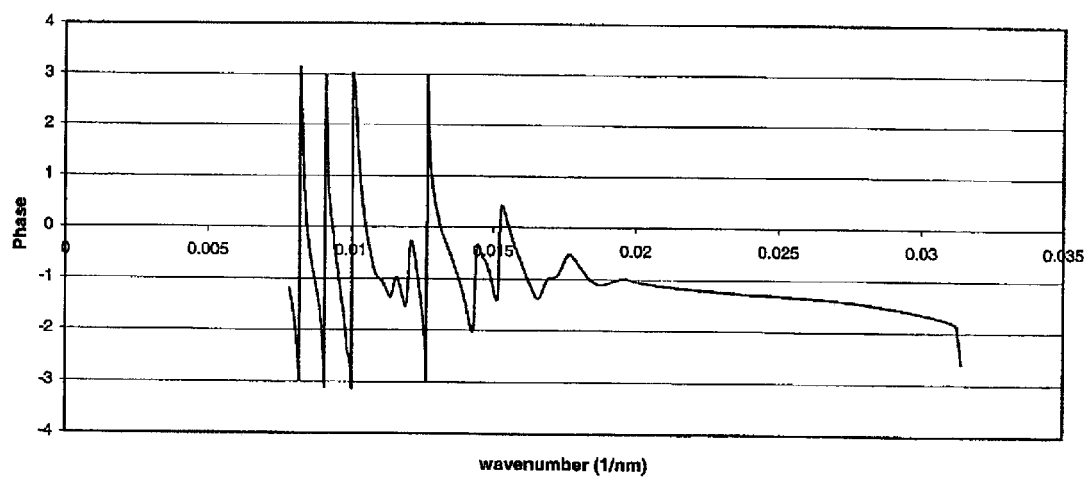
Fig. 9

OPTICAL FILM TOPOGRAPHY AND THICKNESS MEASUREMENT

FIELD

This invention relates to the field of instrumentation for measuring the physical properties of thin films, such as those used in the microelectronics industry. More particularly, this invention relates to non contact measurement of film topography and thickness.

BACKGROUND

Integrated circuits, such as monolithic semiconducting devices, are formed by layering materials with different properties on top of each other to form devices such as resistors, capacitors, and transistors of different types into complex circuits. The different layers are processed in a variety of ways. For example, one layer may need to have features etched into it, where the etched features form voids that extend down into the layer. Other layers may need to be deposited into such etched voids. Often, the one layer that is deposited into the voids of another layer may need to be removed from the top of the layer in which the voids are formed, so that the second layer is only within the voids.

Because of these and other specialized requirements for the physical shape of the different layers used in integrated circuit fabrication, specialized instruments have been developed to help determine the topography and thickness of the various layers that are formed. For example, the topography of a layer of transparent material, such as an oxide, can be determined from instruments that physically contact the surface of the transparent layer, such as mechanical profilers or atomic force microscopes. The thickness of transparent layers can be determined by the use of spectroreflectometers, or ellipsometers.

If the layer is formed of a non transparent or opaque material such as a metal, then in addition to mechanical profilers, other methods can be used to determine the topography of the layer, such as an interferometric profiler. Unfortunately, interferometric profilers cannot be used to determine the topography of transparent layers, or layers such as those briefly described above where a transparent material is disposed alongside an opaque material in an array, because the phase shifts dependent on the thickness of the transparent material confounds the reflected readings received back by the interferometric profiler. Further, a spectroreflectometer or an ellipsometer cannot be used to measure the topography of either type of layer, or to measure the thickness of an opaque layer. Thus, the instruments that have been developed are somewhat limited in their application, but work well when the properties of just an opaque layer or just a transparent layer are to be determined.

Unfortunately, there are more and more applications of mixed layers such as those described above, where a material such as copper is deposited into the voids that have been etched into a material such as silicon dioxide, and then the copper is thinned such as in a chemical mechanical planarization process down to the level of the upper surface of the silicon dioxide. When such a structure is formed, an array of both opaque sections and transparent sections is formed in the top surface of the compound layer. This array is very difficult to characterize without the use of an instrument that makes physical contact with the surface, such as the mechanical profilers and atomic force microscopes. However, it is often desirable to not make any contact with the surface of the array.

There is a need, therefore, for a system by which both the topography of the array surface and also the thickness of the transparent material portions of the array can be determined without making physical contact with the array layer surface.

SUMMARY

The above and other needs are met by an apparatus capable of measuring topography and transparent film thickness of a patterned metal-dielectric array in a layer on a substrate without contact with the surface of the layer. A broadband interferometer measures an absolute phase of reflection at a plurality of wavelengths from a plurality of locations within a field of view on the metal-dielectric patterned layer on the substrate, and produces reflection phase data. An analyzer receives the reflection phase data and estimates the transparent film thickness and the topography at each of the plurality of locations from the reflection phase data.

In this manner, the apparatus is not confounded by the phase changes produced in the reflected light by the transparent layers, because the thickness of the transparent layers is determined by using the reflection phase data from multiple wavelengths. Further, the surface topography of the layer, whether it be opaque, transparent, or an array of opaque objects embedded in a transparent layer is also determinable. Thus, the present invention provides a means by which both transparent layer thickness and topography can be determined on a surface of transparent and opaque layers, without contacting the surface.

In various preferred embodiments, the broadband interferometer is a low-NA, UV-visible Michelson imaging interferometer. In one embodiment the broadband interferometer is preferably focused into a UV-sensitive linear detector array adapted for viewing a linear slit formed field of view on the patterned layer on the substrate. A xenon lamp illumination source is preferred, having a measured wavelength range of from about two hundred and thirty nanometers to about eight hundred nanometers.

Preferably included are illumination and collection objectives, each having two off-axis spherical mirrors, one of each such mirrors being convex and one of each such mirrors being concave. The apparatus preferably includes beam splitter and phase compensation plates, where the plates are formed as flat, parallel plates of equal thicknesses of fused silica, and most preferably cut from a single polished plate of fused silica.

An illumination fold mirror is present in the preferred embodiment. Also preferably included is a reference mirror mounted on a piezoelectric stage, most preferably adapted to scan in a direction along the optical axis, z, where an intensity of each of a number N of array pixels is recorded at a number Q of different z positions. In an especially preferred embodiment, N is 128 and Q is 512. Most preferably, the analyzer performs a Fourier transform on the Q different intensities measured at the Q z positions for each pixel to determine the phase versus wave number for that pixel. In another embodiment a spectrometer and a UV sensitive charge coupled device are used instead of the linear UV-sensitive detector.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 4 is an interferogram for a transparent film depicting intensity versus reference mirror position, FIG. 5 is a chart of the transparent film phase spectrum depicting phase versus wave number, FIG. 6 is an interferogram for a copper pad depicting intensity versus reference mirror position, FIG. 7 is a chart of the copper phase spectrum depicting phase versus wave number, FIG. 8 is an interferogram for a metal and dielectric array depicting intensity versus reference mirror position, and FIG. 9 is a chart of the metal and dielectric array phase spectrum depicting phase versus wave number.

DETAILED DESCRIPTION

Figure 1:
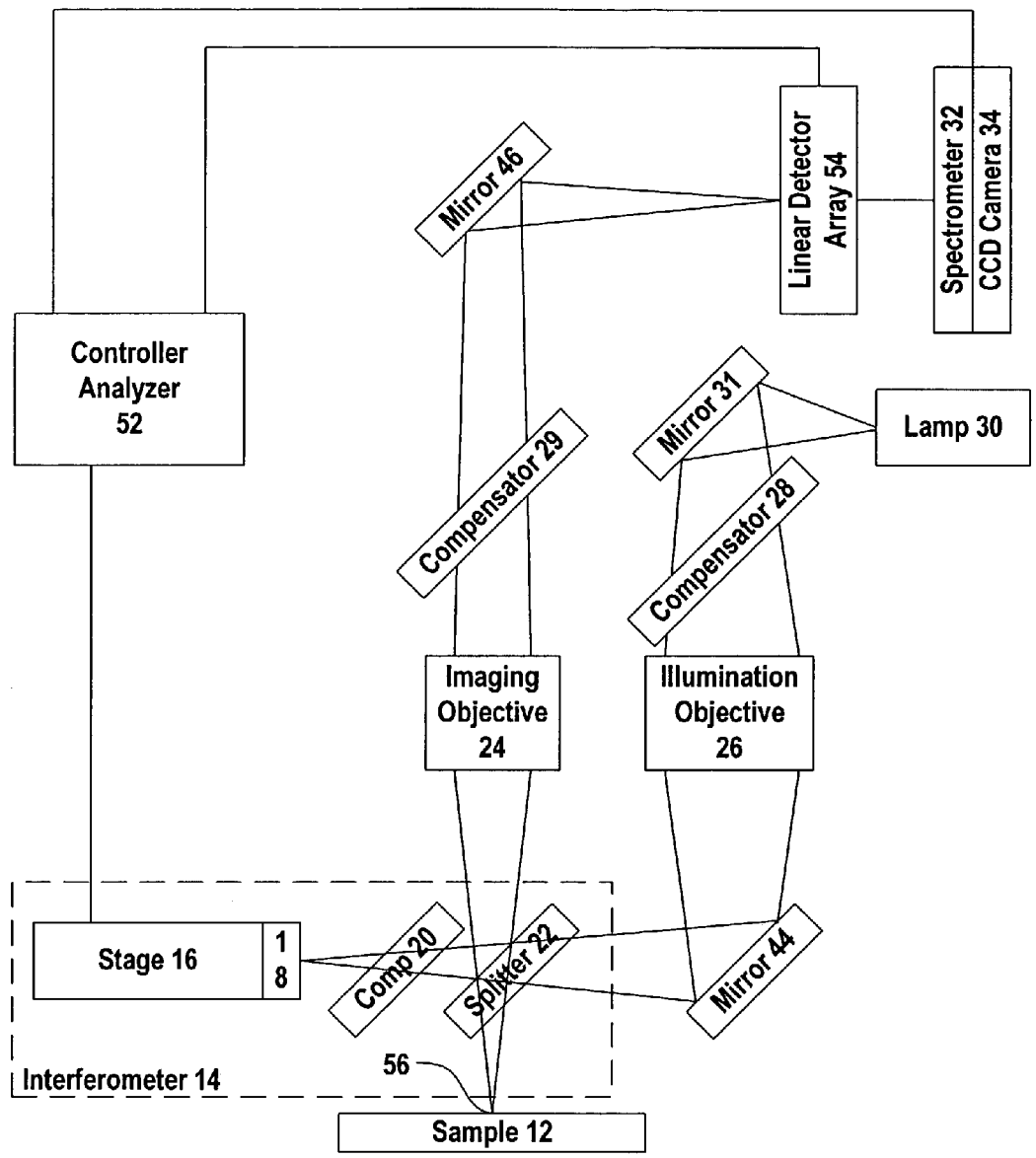
FIG. 1 is a functional block diagram of the apparatus according to a preferred embodiment of the invention.

An interferometer 14, such as a low-NA, UV-visible Michelson imaging interferometer, is focused into a UV-sensitive linear detector array 54, such as a Hamamatsu S3901-128Q viewing a linear slit-like field 56 of about five microns by about three hundred microns on a metal-dielectric patterned layer on a sample 12, such as a semiconductor wafer. Optical schematics of the preferred embodiment are given in FIGS. 2 and 3. Preferably, a xenon lamp 30 is used as the illumination source, and a wavelength range of no less than from about two hundred and thirty nanometers to about eight hundred nanometers is measured. The illumination objective 26 and the collection or imaging objective 24 each preferably consist of two off-axis spherical mirrors, one convex 58 and one concave 60, as depicted in FIGS. 2 and 3.

Figure 2:
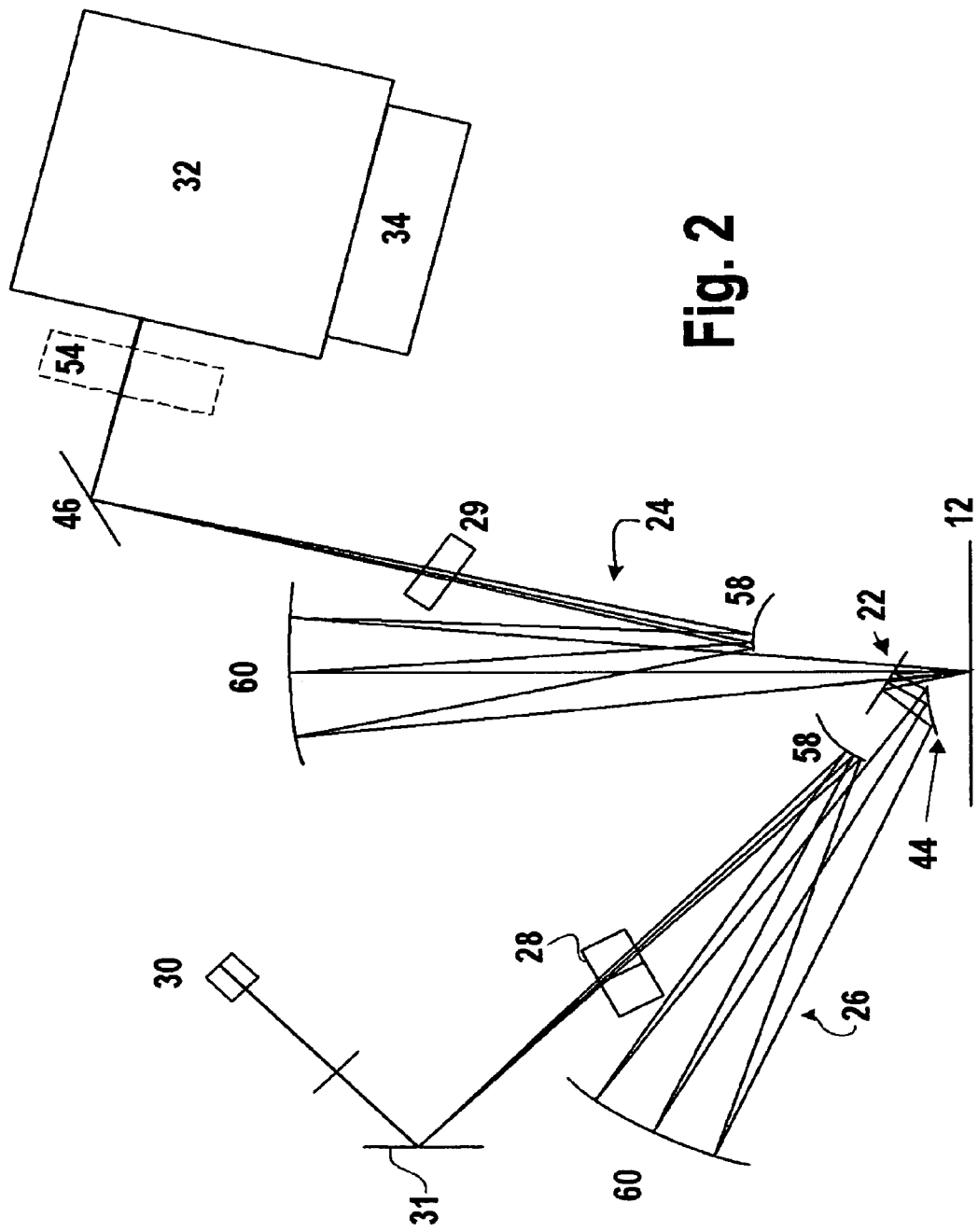
FIG. 2 is a representation of the sample image beam path, showing three rays.
Figure 3:
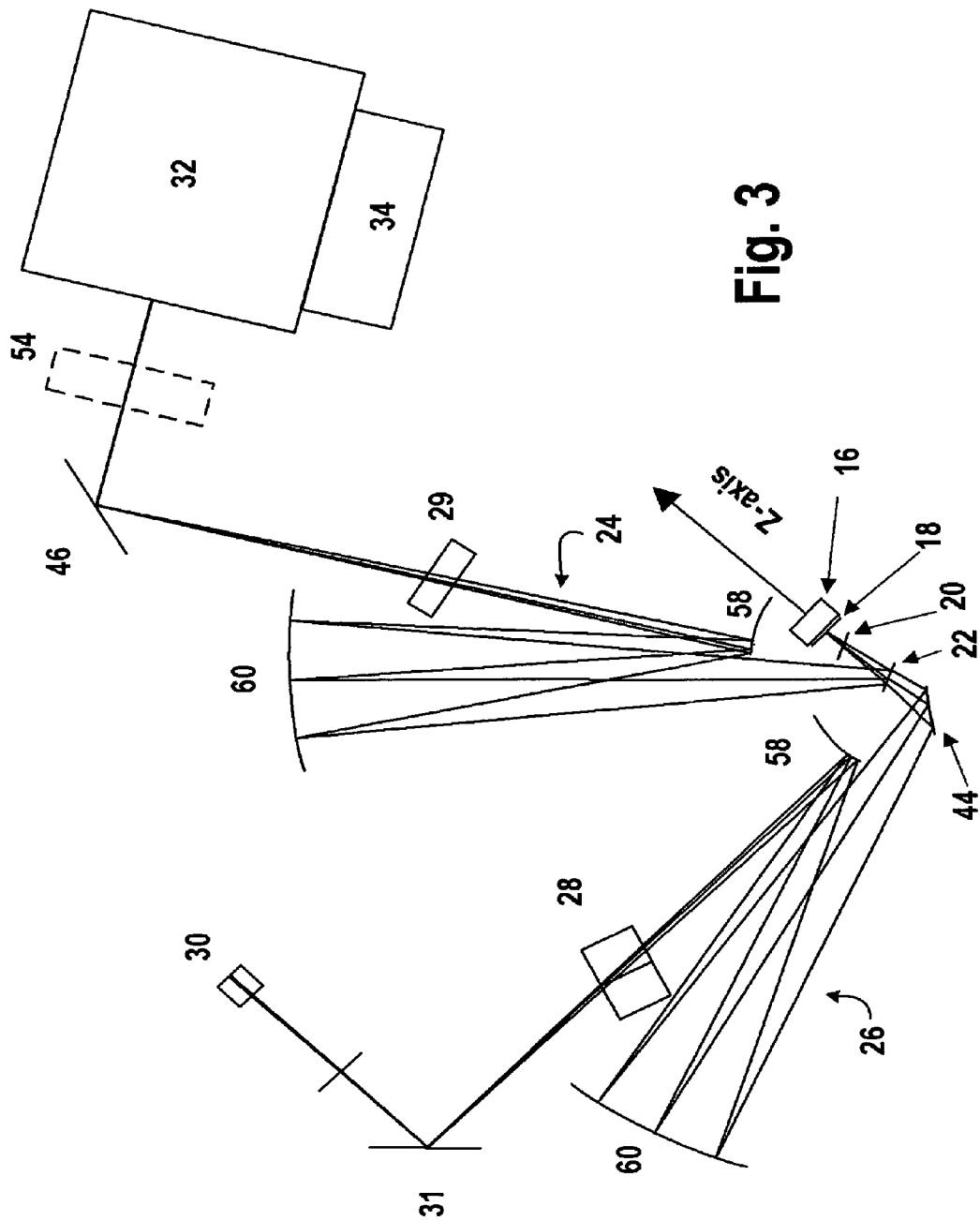
FIG. 3 is a representation of the reference beam path, showing three rays.

FIGS. 2 and 3 also depict the beam paths of the interferometer sample and reference beams, respectively. The sample and reference beams share the same path through the illuminator consisting of the lamp 30, the lamp fold mirror 31, the aberration compensator 28, the convex mirror 58, the concave mirror 60, and the illumination fold mirror 44. The two beam paths then diverge, and the sample beam reflects from the beam splitter 22, continues down to reflect from the sample 12, and then passes through the beam splitter again to continue up to the imaging objective 24. The reference beam passes through the beam splitter 22, through the phase compensation plate 20, reflects from the reference mirror 18, and passes back through the phase compensation plate 20 and then reflects off the beam splitter 22 and into the imaging objective 24.

The sample and reference beams are recombined at the top surface of the beam splitter 22 and share the same path through the imaging and detection optics, including the concave mirror 60, the convex mirror 58, the aberration compensator 29 and the imaging fold mirror 46. In one embodiment, the sample field of view is focused onto a UV-sensitive linear array detector, 54. In another embodiment the field of view is imaged onto the entrance slit of a UV-Visible spectrometer 32. The spectrometer disperses the light according to wavelength and images the entrance slit onto a UV-sensitive CCD array 34. Although the convex mirrors 58 and concave mirrors 60 are shown to be identical in the illumination and imaging objectives, they need not be.

The beam splitter 22 and the phase compensation plate 20 are preferably parallel, thin, flat plates of fused silica of equal thickness, most preferably cut from a single polished plate. Other optical materials that have good UV transmission could be used instead of fused silica, such as sapphire or magnesium fluoride. This simple beam splitter 22 and phase compensator 20 have the advantage that they are easy to model in the analyzer 52 software and are stable in changing environments. Broadband coatings could be added to increase the reflectivity and therefore the contrast of the interferometer, but are more difficult to model and are subject to drift from environmental changes. A single beam splitter cube could also be used instead of the beam splitter 22 and phase compensator 20. The lamp mirror 31, illumination fold mirror 44, and imaging fold mirror 46 are preferably included to make the system 10 more compact, but are not essential for proper operation of the system 10.

The reference mirror 18 is preferably mounted on a piezoelectric stage 16 as is commonly done in optical interferometers. In one embodiment the reference mirror 18 is scanned along the optical axis z, which is the axis along which the reference beam travels from the phase compensator 20 to the reference mirror 18. The intensity of N array pixels are recorded at Q different, preferably equally spaced z positions by the data acquisition system that interfaces the linear detector 54 to the analyzer 52. Alternately, the reference mirror 18 may be fixed and the sample 12 may be scanned in the direction along the optical axis, which is the axis along which the sample beam travels from the splitter 22 to the sample 12. In either case the scanning direction need not be exactly along the optical axis, but is preferably in a direction that has a non-zero component along the optical axis. It is not necessary to use a piezoelectric stage 16, and other stages for which the motion can be controlled with a resolution of about ten nanometers or less are usable for either the reference mirror 18 or the sample 12.

Preferable values for N and Q are 128 and 512, but any values of N from about two to about ten thousand are possible, as are values of Q from about ten to about ten thousand. The difference between adjacent mirror positions, $\Delta z$, is preferably less than about one half the shortest wavelength used, and the total travel for the Q z positions, $Q*\Delta z$, is preferably longer than the longest wavelength used and longer than the thickness of the film being measured. In this preferred embodiment $\Delta z$ is preferably less than about one hundred and fifteen nanometers and the total travel $Q*\Delta z$ is preferably at least about eight hundred nanometers.

Smaller values of $\Delta z$ tend to give better resolution, but also tend to require larger values of Q to achieve the minimum total range, requiring more time to perform the measurement. A preferred value for $\Delta z$ is about ten nanometers, but values from about one one-hundredth of a nanometer to about one hundred nanometers are possible. For each pixel M, the Q values of intensity make up an interferogram for that pixel. There will be M interferograms, corresponding to M adjacent locations within the linear field of view on the wafer. A controller/analyzer 52 is preferably used to both control the various elements of the system 10, and to receive and analyze the data, as described in more detail below.

Each interferogram is processed to determine if the sample at that location is a transparent film such as silicon oxide, an opaque layer such as a copper pad, or an unresolved array of transparent and opaque portions, such as copper lines in an oxide film. The processing to classify the interferogram is preferably accomplished by first performing a Fourier transform on the interferogram. The transform of the interferogram consists of an array of complex numbers. The complex argument of each number represents the phase of the optical reflection, and the array of arguments forms the phase spectrum. Similarly, the absolute values of the complex numbers form the magnitude spectrum.

The phase values in the phase spectrum preferably correspond to differences in the optical phase between the sample beam and the reference beam, and equivalently, between the sample reflection phase and the reference mirror reflection phase. The reference mirror preferably represents a reference for the sample phase. Any tilt or other phase non uniformity in the reference mirror can be mistaken for fictitious topography in the sample. This is preferably eliminated by calibrating the system on a known uniform flat sample so that any phase non uniformity can be attributed to the reference mirror. This phase non-uniformity is preferably stored in the analyzer memory and subtracted from subsequent measurements.

Examples of interferograms for a transparent film, copper, and a copper dielectric array are shown in FIGS. 4, 6, and 8, respectively. The phase spectra of the interferograms 4, 6, and 8 are given in FIGS. 5, 7, and 9, respectively. The phase spectrum of a copper pad only crosses zero once over the range of data. The transparent film phase spectrum gets very near a value of $-\pi$ a total of six times, while a metal/dielectric array approaches that value a total of four times. Another method of distinguishing transparent film spectra from transparent-opaque array spectra is to analyze the average value of the phase over a subset of the phase spectrum. The metal/dielectric array tends to have a negative bias in the first half of the spectrum whereas the transparent film spectrum tends to have a nearly zero average value. Other aspects of the interferograms, the phase spectra, or the magnitude spectra can be used to classify the sample. Alternately, information from the operator can be used to setup a measurement recipe which determines the correspondence of each pixel to a particular class of sample.

If the sample is a transparent film, the phase spectrum is preferably used to regress the film thickness and the height (z value) of the film surface. The magnitude of the spectrum contains information only about the film thickness, but the phase spectrum contains information about both the film thickness and the topography. In another embodiment, both the phase and magnitude of the signal are used for the regression.

Regression of film thickness from the square of a magnitude spectrum is well known in the art and is often called spectroreflectometry. Another technique called spectroscopic ellipsometry is also used to measure film thickness. In spectroscopic ellipsometry the reflectance magnitude ratio between the s and p polarizations of the light are measured as well as the phase difference between the two polarizations, forming two spectra usually called TANpsi and COSdelta. These techniques forms the basis of many commercial instruments for measuring film thickness.

In these techniques a mathematical model of the reflection from the film is used to calculate hypothetical spectra based on a set of initial film parameters, such as thickness of the various layers, and indices of refraction of the layers. The hypothetical spectra are compared to the measured spectrum and the initial film parameters are varied to improve the match between calculated and measured spectra. This process is iterated until an acceptable match is obtained. The film parameters used to obtain the match are considered to be the best estimates of the parameters. The mathematical modeling of reflection from films is discussed in detail in "Ellipsometry and Polarized Light," by R. Azzam and N. Bashara. General methods for regression are discussed in "Numerical Recipes in C," by W. Press et al.

The techniques of spectroreflectometry and spectroscopic ellipsometry cannot be used to determine the topography of the surface, however, because they do not have a phase reference from which to measure the phase information. In this embodiment one additional regression parameter is added, the z position of the surface, and instead of the magnitude spectrum or the TANpsi and COSdelta spectra, the phase spectrum, or both the magnitude spectrum and the phase spectrum is used. The regression is performed in the usual way, and both the usual film parameters and the z position are estimated.

If the sample is an opaque layer or an array of transparent and opaque layers, then the interferogram contains a large pulse 62 due to the reflection from the opaque surface, as depicted in FIGS. 6 and 8. This large pulse 62 contains a major peak that is preferably used to determine the position of the surface. If the sample is an array of layers, additional smaller pulses are typically present, due to reflections from the underlying film interfaces. The reflection from the top dielectric in the array adds into the large pulse 62. If the top dielectric surface is not at the same level as the metal lines the major pulse is broadened. The width 64 (depicted in FIG. 8) of the large pulse 64 can therefore be used to evaluate whether the metal lines are recessed below the surface of the dielectric.

In another embodiment, the phase or phase and magnitude reflectance information is used to regress some of the properties of the array, including surface height, metal recess, metal line width, etc. Currently, spectroreflectometry and spectroscopic ellipsometry are used to determine these parameters in commercial instruments, but the surface topography cannot be determined since there is no phase information. In this embodiment, a map is generated containing the height of the sample at each pixel, as well as the film thickness for those pixels that correspond to transparent film, and metal recess for those pixels that correspond to arrays.

In another embodiment of the invention, called spectroscopic interferometry, a spectrometer 32 and a UV-sensitive imager 34, such as a CCD, replaces the linear detector array 54. The CCD 34 has M pixels in the non-dispersed direction and N pixels in the dispersed direction. The light from each of the M spatial locations on the sample is dispersed by the spectrometer into a row of pixels in the CCD. This row has N pixels, each one having in effect an interferometer associated with it. Each of the N interferometers covers a narrow range of wavelengths and is essentially monochromatic.

The z stage is scanned and Q' values of intensity are recorded at Q' different z positions. Preferable values for N, M and Q' are 1024, 128, and 20, but any values of N from about three to about ten thousand are possible, as are values of M from about two to about ten thousand, as well as values of Q' from about three to about one thousand. The Q' values of intensity for each of the M×N pixels form a small interferogram. These interferograms are very nearly pure sine waves due to the nearly monochromatic light at each pixel. The frequency of each of these sine waves depends on the wavelength of the light reaching that pixel. The wavelengths can be calibrated by methods normally used for calibrating spectrometers. One method is to introduce a spectral lamp, such as a mercury lamp, into the illuminator temporarily to produce a series of spectral lines of known wavelengths. The spectral lines create peaks in the response of the CCD versus pixel. A smooth function can be fit by the method of least squares to give wavelength as a function of pixel number.

Each interferogram could be processed by the usual signal processing methods of phase shifting interferometry, as is well known in the art, and are explained in detail in "Optical Shop Testing" by Daniel Malacara. A better method is to process the M×N×Q' data values in a large regression to yield reflection magnitude and phase at each of the M spatial pixels and each of the N wavelengths. In this embodiment, the errors caused by an imperfect z stage are preferably accounted for in the regression. This is due to the fact that the same z position errors tend to appear for all pixels. In this embodiment, the parameters to be regressed are M×N phases, M×N magnitudes, and Q' z position errors, totaling 2×M×N+Q' parameters. There are M×N×Q' data values. If the preferred values of M, N, and Q' are used, there are 131,092 parameters to be regressed and 2,621,440 data values. Seed values for the phase and magnitude parameters can be obtained by the usual signal processing methods of phase shifting interferometry. In particular, the least-squares method for Q' steps can be used.

As an alternative to using the calibration wavelength versus pixel function for the sine wave frequencies, the frequencies may be considered as additional parameters to be varied in the regression. Each of the N columns of CCD pixels has a single interferometer frequency associated with it, so that N additional parameters are regressed, for a total of (2×M+1)×N+Q'. The calibrated function of wavelength versus pixel number is preferably used to determine seed values for the N frequencies.

The total number of data points and regression parameters tends to be large and may require a calculation time that is longer than desired when processed in a single regression. One method to speed up the calculation is to break the regression into parts. For example, each column could be processed separately. In this case the regression parameters would consist of M magnitudes, M phases, Q' z position errors, and optionally, one frequency. Thus a total of 2×M+Q'+1 parameters with M×Q' data points, or 277 parameters and 2,560 data points with the preferred values of M, N, and Q'. Other methods of partitioning the regression could also be used.

The N phase and magnitude values at each of the M rows comprise phase and magnitude spectra for that pixel. The spectra can be used in the same manner as in the first embodiment to yield topography and film thickness for transparent films.

In the case of metal or metal/dielectric arrays, the phase and magnitude spectra are converted into a broadband interferogram by means of the inverse Fourier transform. The broadband interferogram is processed as above. The advantage of this embodiment is that the Q' z position values can be estimated by the regression along with the magnitude and phase values. This allows much greater vibration immunity, allowing the system to be used on a platform without active vibration isolation.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. An apparatus capable of selectively measuring both topography and thickness of a sample, the apparatus comprising:
 a light source adapted to create a light beam a variable wavelength within a wavelength range,
 a splitter adapted to split the light beam into a reference beam and a sample beam,
 a reference mirror adapted to receive the reference beam and reflect it back along an imaging path,
 a sample holder adapted to hold the sample, where the sample receives the sample beam at a plurality of pixel locations within a field of view and reflects it back along the imaging path,
 a stage adapted to move at least one of the reference mirror along a first axis of the reference beam and the sample along a second axis of the sample beam,
 a detector adapted to receive both the reference beam and the sample beam from the plurality of pixel locations as the stage moves to a plurality of different positions along at least one of the first axis and the second axis, thereby generating a matrix of intensity values, and
 an analyzer for receiving the matrix of intensity values, the analyzer adapted to,
  arrange the intensity values for a given pixel location as the stage moves along at least one of the first axis and the second axis into an interferogram,
  perform a Fourier transform on the interferogram for each pixel location to produce an array of complex numbers,
  determine phase values from complex portions of the complex numbers, and
  use a model of film parameters to selectively iteratively regress at least one of the thickness and the topography of the sample at the plurality of pixel locations from the phase values.

2. The apparatus of claim 1, wherein the sample is a transparent film on a semiconductor wafer.

3. The apparatus of claim 1, wherein the sample is an array of opaque features embedded in a transparent film on a semiconductor wafer.

4. The apparatus of claim 1, wherein the sample is an array of copper features embedded in a dielectric film on a semiconductor wafer.

5. The apparatus of claim 1, wherein the analyzer is further adapted to determine magnitude values from absolute values of the complex numbers, and use the model of film thickness to selectively iteratively regress at least one of the thickness and the topography of the sample at the plurality of pixel locations from both the phase values and the magnitude values.

6. The apparatus of claim 1, wherein the wavelength range is from about three hundred and fifty nanometers to about six hundred nanometers.

7. The apparatus of claim 1, wherein the detector is a UV-sensitive linear detector array adapted for viewing a linear slit formed field of view on the sample.

8. The apparatus of claim 1, wherein the light source is a xenon lamp.

9. The apparatus of claim 1, further comprising illumination and collection objectives each having two off-axis spherical mirrors, one of each such mirrors being convex and one of each such mirrors being concave.

10. The apparatus of claim 1, wherein the apparatus comprises a Michelson interferometer.

11. The apparatus of claim 1, wherein the apparatus comprises a low-NA, UV-visible Michelson imaging interferometer.

12. The apparatus of claim 11, further comprising beam splitter and phase compensation plates, where the plates are formed as flat, parallel plates of equal thicknesses of optical material.

13. The apparatus of claim 12, where the plates are cut from a single polished plate of fused silica.

14. The apparatus of claim 12, further comprising an illumination fold mirror.

15. The apparatus of claim 1, further comprising a cube beam splitter.

16. The apparatus of claim 1, wherein the stage has a motion resolution of at most about ten nanometers.

17. The apparatus of claim 16, wherein the stage is piezoelectric.

18. The apparatus of claim 16, wherein the stage is scanned with a non-zero component along at least one of the first axis and the second axis, z, where an intensity of light reflected from each of a number N of sample locations is recorded at a number Q of different z positions.

19. The apparatus of claim 18, wherein the number N is at least about two and the number Q is at least about three.

20. The apparatus of claim 1, wherein the detector is a spectrometer and a UV sensitive charge coupled device.

21. A method of selectively measuring both topography and thickness of a sample, the method comprising the steps of:
    create a light beam having a variable wavelength within a wavelength range,
    split the light beam into a reference beam and a sample beam,
    receive the reference beam with a reference mirror and reflect it back along an imaging path,
    receive the sample beam at a plurality of pixel locations within a field of view of the sample and reflect it back along the imaging path,
    move at least one of the reference mirror along a first axis of the reference beam and the sample along a second axis of the sample beam with a stage,
    receive both the reference beam and the sample beam from the plurality of pixel locations as the stage moves to a plurality of different positions along at least one of the first axis and the second axis, thereby generating a matrix of intensity values,
    arrange the intensity values for a given pixel location as the stage moves along at least one of the first axis and the second axis into an interferogram,
    perform a Fourier transform on the interferogram for each pixel location to produce an array of complex numbers,
    determine phase values from complex portions of the complex numbers, and
    use a model of film parameters to selectively iteratively regress at least one of the thickness and the topography of the sample at the plurality of pixel locations from the phase values.

22. The method of claim 21, further comprising the steps of determine magnitude values from absolute values of the complex numbers, and use the model of film thickness to selectively iteratively regress at least one of the thickness and the topography of the sample at the plurality of pixel locations from both the phase values and the magnitude values.

* * * * *